United States Patent [19]

Hutter, III

[11] 4,391,663

[45] Jul. 5, 1983

[54] METHOD OF CURING ADHESIVE

[76] Inventor: Charles G. Hutter, III, 4110 County Line, Carson City, Nev. 89701

[21] Appl. No.: 391,238

[22] Filed: Jun. 23, 1982

Related U.S. Application Data

[63] Continuation of Ser. No. 213,312, Dec. 5, 1980, abandoned.

[51] Int. Cl.³ .............................................. C03C 27/00
[52] U.S. Cl. ..................................... 156/64; 156/109; 156/272.2; 156/275.1; 156/275.5; 156/359; 219/358
[58] Field of Search ............... 156/359, 109, 380, 272, 156/64; 219/359, 516; 236/15 BB

[56] References Cited

U.S. PATENT DOCUMENTS

| | | | |
|---|---|---|---|
| 3,560,290 | 2/1971 | Sendor et al. | 156/227 |
| 3,616,319 | 2/1972 | Auld | 219/347 |
| 4,110,148 | 8/1978 | Rochell | 156/109 X |
| 4,140,050 | 2/1979 | Giddings | 156/359 X |

Primary Examiner—David A. Simmons
Attorney, Agent, or Firm—Fulwider, Patton, Rieber, Lee & Utecht

[57] ABSTRACT

A method is provided for rapidly and thoroughly curing a heat curable adhesive substance by application of radiation heat energy without excessive temperature elevation of the adhesive substance. The method comprises the controlled application of radiation heat energy to the adhesive substance for elevating the exposed surface of the adhesive substance to a predetermined maximum temperature level. The radiation heat energy is then alternately removed from the adhesive substance to allow the exposed surface to cool partially, and resupplied to the adhesive substance to reheat the exposed surface to the predetermined maximum temperature level. This alternating controlled application of the radiation heat energy produces a thermal oscillation within the adhesive substance resulting in a rapid temperature rise and corresponding rapid cure time of portions of the adhesive substance not directly exposed to the radiation heat energy.

10 Claims, 5 Drawing Figures

METHOD OF CURING ADHESIVE

This is a continuation of application Ser. No. 213,312, filed Dec. 5, 1980, now abandoned.

BACKGROUND OF THE INVENTION

This invention relates to a method of quickly and easily curing adhesive substances. More specifically, this invention relates to such a method wherein radiation heat energy is cyclically applied to the adhesive substance in a controlled manner to ensure rapid curing of the adhesive substance without heating any portion of the adhesive substance to an excessive temperature level.

Curable adhesive substances in general are well known in the art and are used widely in a large number of industrial applications. For example, in one common industrial application, such adhesive substances are used in the manufacture of so-called insulated windows and/or doors. In the manufacture of these products, two panes of glass or other suitable glazing material are separated in parallel from each other by appropriate peripheral spacers and are mounted within appropriate rigid frames for a window or door. However, prior to mounting in the frame, a bead of a suitable curable adhesive substance is interposed between the two panes to help secure them together and to hermetically seal from atmosphere the insulation space between the two panes. In this manner, the two panes are more easily handled for installation into their respective frame, and condensation of moisture between the panes upon fluctuations in climatic conditions is avoided. Conveniently, it is known to provide a desiccant material such as a molecular sieve within the space for adsorption of moisture and/or gaseous fumes from within the insulating space.

In the manufacture of insulated windows and doors, it is highly desirable to cure the adhesive substance as rapidly and as completely as possible to maximize the production rate of the units. That is, the two panes of any given window cannot be moved or handled for any production purpose until the sealing bead of the adhesive substance is substantially completely cured. One common method of curing the adhesive substance is to allow the two panes to stand untouched while the adhesive substance cures at ambient temperature. Clearly, however, this procedure consumes a relatively long period of time, such as on the order of about four hours, and is therefore inconsistent with maximization of production rate. Moreover, substantial storage facilities are required to provide the necessary space for storage of units during curing of the adhesive substance.

Since these adhesive substances typically comprise polymeric resin substances formed from a mixture of base and accelerator materials, one way to speed curing of the adhesive substance is to increase the relative proportion of the accelerator material. This can, however, cause the substance to cure before it can be satisfactorily applied to the glass panes. In addition, this alteration of the substance composition can adversely affect both the sealing and the bond strength of the substance when cured.

Various other attempts have been proposed in the prior art for increasing the cure rate of the adhesive substance and thereby correspondingly increase the overall unit production rate. One such proposal comprises the placement of the units within a hot air oven to substantially elevate the temperature of the adhesive substance for purposes of curing the adhesive substance. However, this technique exposes the entire unit including the sealed insulation space between the two panes to the elevated temperature. This tends to increase the pressure level of the air trapped between the panes to cause displacement of portions of the adhesive substance to break the hermetic seal, or alternately, tends to cause the two panes to bulge outwardly with respect to each other.

An alternate proposal comprises subjecting the assembled units to relatively elevated but lower temperature levels within a hot air oven or in close proximity with a radiation heating device. Such arrangements are effective to increase the temperature levels of the adhesive substance to correspondingly increase the rate of curing of the adhesive substance. However, the use of a lower temperature hot air oven provides only marginal improvements over the prior art method of exposing the panels to ambient air for prolonged time periods. The exposure of the adhesive substance to radiant heat energy renders the substance susceptible to blistering and degradation as a result of localized overheating unless the radiation heat energy is applied at a relatively low power level. However, the use of low power radiation heat energy does not provide the desired rapid cure of the adhesive substance.

It is therefore desirable to provide an improved method for curing adhesive substances used in industrial applications wherein the adhesive substance is rapidly cured at a maximized cure rate by controlled cyclic application of radiation heat energy without overheating of the adhesive substance and without substantial heating of the surrounding air or structural components.

SUMMARY OF THE INVENTION

In accordance with the invention, an improved method of curing heat-curable adhesive substances is provided comprising the controlled cyclic application of radiation heat energy to the adhesive substance. The initial application of radiation heat energy is controlled to elevate the exposed, irradiated surface of the adhesive substance to a predetermined maximum temperature level in a minimum time period. When this predetermined temperature level is reached, the radiation heat energy if removed from the adhesive substance, such as by turning off the radiant heat source from which the radiation heat energy is emitted. This removal of the radiation heat energy from the adhesive substance allows the exposed surface of the substance to begin to cool, with a thermal gradient remaining between the exposed substance surface and the interior portions of the substance whereby those interior portions tend to continue to elevate in temperature. After the exposed surface of the substance has cooled to a predetermined temperature level, the radiation heat energy is reapplied to the exposed substance surface to reheat said surface to the predetermined maximum temperature level. The radiation heat energy is then once again removed from the substance, and then resupplied to the substance in a cyclical sequence at controlled time intervals to create a thermal oscillation within the adhesive substance. This controlled thermal oscillation is chosen to produce a maximum and rapid temperature rise of the adhesive substance throughout its full depth without subjecting the exposed surface of the adhesive substance to overheating.

The invention of this application is well suited for use in curing the peripheral sealing bead of an adhesive substance which joins together two parallel panes of glazing material in an insulated window or door unit. More specifically, the method subjects the bead of adhesive substance to a cylic application of radiation heat energy to cure the substance completely throughout its full depth in a minimum time period without overheating any portion of the adhesive substance. Moreover, it has been found that the method of this invention does not excessively increase the temperature level of the surrounding air and other structural components of the window or door unit.

Other features and advantages of the present invention will become apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
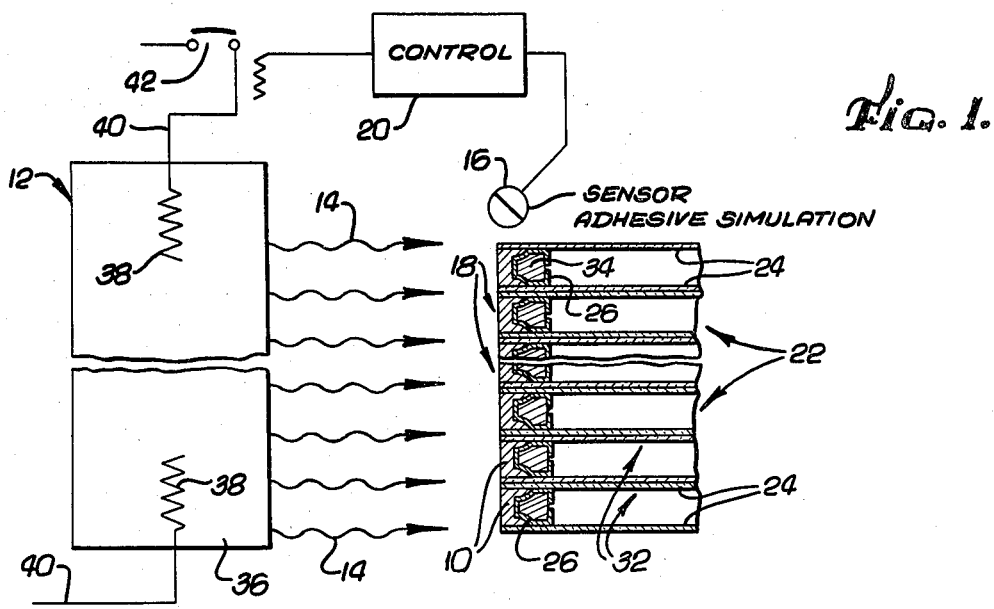
FIG. 1 is a schematic diagram illustrating the method of this invention.

As illustrated by the exemplary drawings, the invention comprises a method of curing a heat curable adhesive substance or the like by controlled application of radiation heat energy. More specifically, as illustrated in FIG. 1, an adhesive substance 10 such as a sealing bead for use in insulated window or door units is positioned at a specified distance from a source 12 such as an electrical-powered radiation heater for generating radiation heat energy. The adhesive substance is thus directly exposed to the radiation heat energy indicated by arrows 14 emanating from the source 12 to elevate the temperature level of the adhesive substance 10 and thereby affect a a rapid cure of the adhesive substance. A heat sensor 16 is positioned adjacent to the adhesive substance 10 and responds to the irradiating heat energy from the source 12 to provide an appropriate electronic signal representing the temperature level and the temperature rise characteristics of the exposed surface 18 of the adhesive substance 10. This electronic signal is supplied to a control 20 which operates to cyclically turn the source 12 on and off as a function of the temperature level of the exposed surface 18 of the substance in a manner to minimize cure time of the substance while preventing overheating thereof.

The method of this invention is designed for maximum curing rate of the adhesive substance 10 without excessive temperature elevation of the substance, or of the surrounding air or structural components. In this manner, the adhesive substance 10 is cured at a maximum possible rate throughout its entire depth without any degradation of the adhesive substance due to excessive temperature levels. Moreover, substantial heating of the surrounding air and structural components is also avoided, which can be advantageous in certain operating environments.

The method of this invention is illustrated in the accompanying drawings for use in curing a peripheral bead of the adhesive substance 10 used in the manufacture of insulated window and/or door units 22. More specifically, each unit 22 comprises a pair of transparent panes 24 of glass or other suitable glazing material wherein the panes 24 of each unit are maintained in a predetermined parallel spatial relationship by a peripheral spacer 26. This spacer 26 is typically formed from extruded aluminum or the like, and the spacer 26 extends peripherally around the four sides of the parallel panes 24, although only one of said sides is shown in the drawings.

As illustrated, the spacer 26 for each unit 22 is inset from the outer periphery of the parallel panes 24 by a relatively small distance on the order of about one-quarter inch. The spacer 26 thus cooperates with the associated panes 24 to define a relatively narrow channel 28 (FIG. 2) peripherally about the unit 22 for reception of the peripheral bead of the adhesive substance 10. As shown best in FIG. 2, the spacer 26 narrows in cross section in a direction toward the channel 28 to define a narrow throat 30 between the spacer 26 and each adjacent pane 24 for reception of a portion of the adhesive substance 10. While shown in exaggerated dimension in FIG. 2, each throat 30 typically has a width between the spacer 26 and the adjacent pane 24 on the order of about 0.015 inch to about 0.020 inch.

When the adhesive substance 10 is cured, as will be described according to the method of this invention, the substance 10 forms a rigid bond across each throat 30 between the spacer 26 and the associated panes 24. This bond is effective to form a rigid unit subassembly which can be handled for subsequent manufacture steps, such as installation within an appropriate window or door frame (not shown). Moreover, the bead of the adhesive substance 10 provides an uninterrupted hermetic seal about the periphery of the unit 22 to isolate from atmosphere the volume between the two panes 24 and within the peripheral spacer 26. This isolated volume thus comprises an insulation space 32 which functions in a known manner to increase the insulation factor of the window or door unit 22. Conveniently, as illustrated, the spacer 26 can be hollow for containing a suitable desiccant material 34 such as a molecular sieve for adsorption of moisture and/or gaseous fumes from the insulation space 32.

The method of curing of this invention is provided for rapidly and thoroughly curing the peripheral bead of the adhesive substance 10 to obtain a secure bond between each spacer 26 and its associated panes 24, and to provide a high quality hermetic seal of the insulation space 32. As illustrated in FIG. 1, the method of this invention is adapted for curing the bead of adhesive substance 10 of a plurality of the window or door units 22 at one time by means of application of radiation heat energy to a plurality of the units arranged in a vertical stack. More specifically, the multiple units 22 are oriented in a vertical stack and then disposed at a predetermined distance from the source 12 of radiation heat energy. Since each window or door unit 22 is conventionally rectangular in shape to include four peripheral sides, the stack of the unit is arranged for irradiation of one of those peripheral sides by the source 12. The distance between the units 22 and the source 12 is chosen as a function of the power level of the source 12 and the chemical composition of the adhesive substance 10 with a preferred distance normally being on the order of about four inches.

The source 12 of radiation heat energy comprises a housing 36 carrying a plurality of radiation heat energy generating members such as a plurality of foil strips 38. These foil strips 38 are suitably coupled by electrical conductors 40 to an appropriate power supply (not shown) via an on-off switch 42. With the switch 42 closed, electrical power can be supplied to the foil strips 38 to cause the strips 38 to generate the desired radiation heat energy, as illustrated by the arrows 14. This radiation heat energy is incident upon the exposed surface 18 of each peripheral bead of the adhesive substance 10 for each window or door unit 22. Accordingly, the exposed surface 18 of the adhesive substance 10 is elevated in temperature to initiate rapid curing of the adhesive substance 10.

Figure 3:
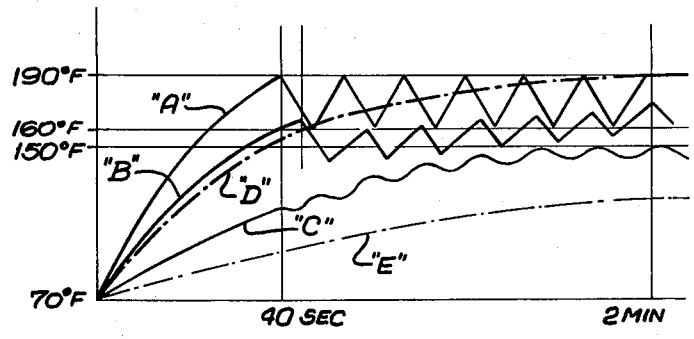
FIG. 3 is a graphic representation of the temperature level during curing of the adhesive substance of FIG. 2.
Figure 2:
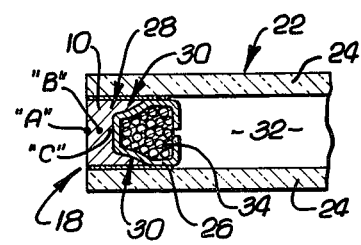
FIG. 2 is an enlarged fragmented vertical section illustrating one end of an insulated window unit including an adhesive substance for curing by the method of this invention.

As illustrated in FIGS. 2 and 3, the source 12 of radiation heat energy is appropriately energized and deenergized according to the temperature level of the exposed surface 18 of the adhesive substance 10 for maximizing the cure rate of the adhesive substance 10 without overheating. More specifically, with the assumption that 190 degrees F. comprises a maximum temperature level for the exposed surface 18 of the adhesive substance 10 without degradation or blistering of the adhesive substance 10, the heat sensor 16 is calibrated to allow a rapid and uninterrupted heating of the adhesive substance 10 until the 190 degree F. temperature level is reached at the exposed surface 18. As soon as this maximum allowable temperature level is reached, the radiation heat energy is removed from the adhesive substance 10 by means of deenergizing the source 12. That is, the heat sensor 16 signals the control 22 to open the switch 42 and thereby turn off the source 12. Conveniently, the operational control of the switch 42 by the control 20 is conventional in the art, whereby detailed structure for achieving this operation is not shown or described herein.

The rapid and uninterrupted temperature rise of the exposed surface 18 of the adhesive substance 10 is illustrated by the point "A" in FIG. 2, the temperature of which corresponds with the plot "A" in FIG. 3. With the parameters previously identified herein, and with a radiation heat energy source 12 having a power density of about 45 watts per square inch and a rapid achievement of about 63% full power output in about 6.0 seconds, the time interval for heating the exposed substance surface 18 from an ambient temperature level of about 70 degrees F. to the maximum temperature level of 190 degrees F. is on the order of about 40 seconds.

The interior portions of the bead of the adhesive substance 10 also elevate in temperature upon application of the radiation heat energy, but at a rate slower than the irradiated exposed surface 18. More specifically, an interior portion of the substance 10 indicated as point "B" in FIG. 2 exhibits a temperature rise corresponding with the plot "B" in FIG. 3. Similarly, a point at the rear surface of the substance 10 indicated in FIG. 2 as point "C" exhibits a temperature rise corresponding with the plot "C" in FIG. 3.

When the source 12 of radiation heat energy is removed from the exposed surface 18 of the adhesive substance 10 after the initial heating period, the exposed surface 18 begins to cool. This cooling is allowed to continue until the exposed surface 18 cools to a predetermined lower temperature level such as about 160 degrees F. Importantly, even though the exposed surface 18 of the adhesive substance 10 is approaching the lower temperature level of 160 degrees F. during the cooling period, a temperature gradient continues to exist between the exposed surface 18 and the remaining nonexposed portions of the adhesive substance 10 whereby the temperature rise of these nonexposed portions continue for at least a part of the cooling cycle. This relative temperature rise of the nonexposed portions of the substance 10 is illustrated by the plots "B" and "C" in FIG. 3 in relation to the plot "A" representing the temperature level of the exposed surface 18.

When the temperature level of the exposed surface 18 of the adhesive substance cools to the predetermined lower level of about 160 degrees F., the heat sensor 16 signals the control 20 which in turn operates to resupply electrical power to the source 12. In this manner, the radiation heat energy is once again applied to the exposed surface 18 of the adhesive substance 10 to reelevate the temperature level thereof to the maximum allowable temperature of about 190 degrees F. When this maximum temperature level is again reached, the heat sensor 16 and the control 20 again removes the radiation heat energy from the adhesive substance by opening the switch 42.

This cyclic application of the radiation heat energy to the adhesive substance 10 is effective to maintain a temperature gradient between the exposed surface 18 and nonexposed portions of the substance 10 throughout the entire curing time. Thus, the interior point "B" and the rear point "C" of the adhesive substance 10 continue to experience an overall elevation in temperature despite the cyclic application of heat energy to the exposed surface 18. This elevation in temperature is somewhat irregular, as shown by FIG. 3, since the temperature gradient varies according to the application or non-application of the radiation heat energy to the exposed surface 18. Nevertheless, the cyclic application of the radiation heat energy is effective to create a thermal oscillation through the entire depth of the adhesive substance 10 resulting in a relatively rapid temperature rise and curing of the substance 10 throughout its entire depth. Importantly, however, the exposed surface 18 of the substance 10 is maintained at a temperature level below that which can cause degradation or blistering of the adhesive substance as a result of localized overheating. Of course, the cyclic application of the radiation heat energy continues until the rearmost surface of the substance 10 reaches a minimum cure temperature, such as about 150 degrees F. as shown in FIG. 3. In the example shown, the heating and cooling cycles are about 10.0 seconds each, and the total cure time for the substance is about 2.0 minutes.

The heat sensor 16 can be designed to measure directly the temperature of the exposed surface 18 of the adhesive substance 10 and to respond to this measured temperature to provide an appropriate signal to the control 20. However, in a large scale production application, it is preferred to provide the heat sensor 16 in the form of a thermocouple calibrated as by experimentation to produce an electronic signal output which simulates and thereby represents the actual temperature of the exposed surface 18.

A comparison between the pulse or cyclic cure method of this invention with a conventional radiation cure method is also illustrated in FIG. 3, wherein plots "D" and "E" are representative of the temperature levels of the exposed and rear surfaces respectively, of an adhesive substance wherein radiation heat energy is applied continuously for curing purposes. Importantly, the continuously applied heat energy must be applied at a lower power level to avoid overheating of the exposed surface to a temperature above about 190 degrees F. Thus, as shown by plot "D," the exposed surface elevates in temperature slowly to a steady state maximum allowable temperature of about 190 degrees F. in about 2.0 minutes. However, for any given portion of the curing cycle, the temperature gradient between the exposed surface (illustrated by plot "D") and the rear surface (illustrated by plot "E") is smaller than the pulse cure method of this invention, resulting in a slower temperature rise of the rear surface. Thus, at the end of a 2.0 minute cycle, the rear surface is at a temperature level far below the minimum cure temperature of 150 degrees F. Accordingly, it is necessary to prolong the cure time until the proper cure temperature of the rear surface is reached, but such prolongation increases the opportunity for the air within the insulation space 32 to elevate in temperature, as well as the surrounding structural components such as the spacer 26 and the glass panes 24.

The pulse cure method of this invention thereby provides substantial advantages by assuring a rapid and complete cure of the adhesive substance 10 without significant opportunity for temperature elevation of surrounding air or structural components. The substantially decreased overall cure time allows for maximum production rates of the window or door units 22 since the units may be handled almost immediately after curing for subsequent processing such as installation in frames (not shown) or the like. Moreover, it has been found that this rapid curing of the adhesive substance 10 tends to improve the bond between the spacer 26 and the panes 24, and also tends to rapidly drive solvents from the adhesive during curing in a manner effective to cleanse the bond area of fingerprints, grease remnants, and the like.

Figure 4:
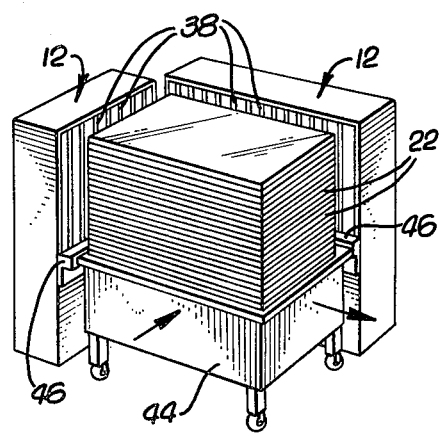
FIG. 4 is a simplified perspective view illustrating use of the method of this invention in an industrial application.

The pulse radiation cure method of this invention is uniquely adapted for commercial application in a continuous conveyor-type system. For example, the stacked units 22 can be carried on carts 44 or the like, as illustrated in FIG. 4, which are conveyed into close association with a pair of sources 12 of radiation heat energy positioned at right angles with respect to each other. These two sources 12 are sized appropriately according to the length and width of the units 22, and appropriate bumpers 46 on the sources 12 provide a predetermined spacing between the units 22 and the sources 12. Of course, each source 12 includes a heat sensor 16 and a control 20 (not shown in FIG. 4) wherein the sensor 16 responds to the input of radiation heat energy to turn the associated source 12 on and off, as required. Conveniently, the sensors 16 can be provided with fan means (not shown) for blowing ambient air across the sensors at the end of the cure cycle for each stack of units 22 to rapidly reduce the temperature of the sensors to that of the ambient air in preparation for the next stack of units 22.

Figure 5:
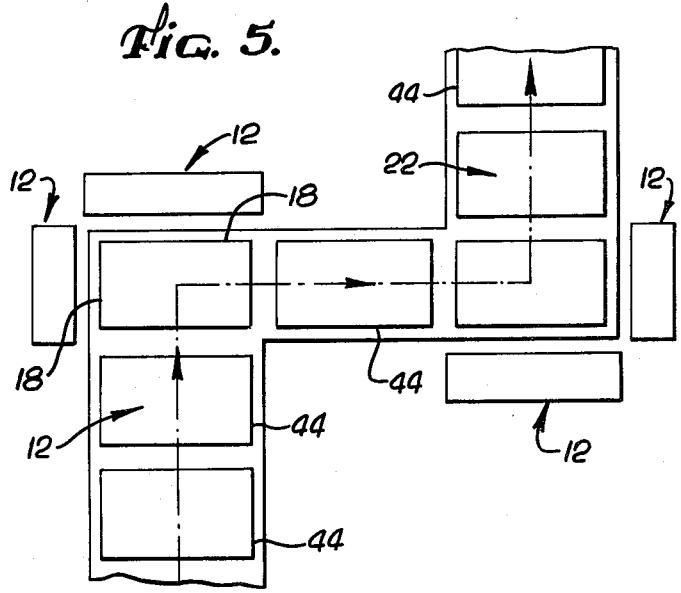
FIG. 5 is a schematic representation of a conveyor line assembly utilizing the method of this invention.

Multiple pairs of the sources 12 can be incorporated into a conveyor-type system as shown in FIG. 5. As shown, a continuous succession of the carts 44 of units 22 can be brought into association with a first pair of the heat sources 12 for curing two sides of the units 22, and then turned at a right angle for association with a second pair of the heat sources 12 for curing the remaining two sides of the units. In this manner, all four sides of the units 22 can be cured quickly and rapidly by association with the heat sources 12 in a continuous process system with a minimum cure time and prevention of overheating damage to the adhesive substance 10.

A variety of modifications and improvements to the invention described herein are believed to be apparent to one skilled in the art. For example, the method of this invention can be used for rapidly heat curing a wide variety of heat curable substances in a correspondingly wide variety of applications. Accordingly, no limitation on the invention is intended, except as set forth in the appended claims.

What is claimed is:

1. A method of curing a heat curable substance, comprising the steps of:
   positioning a heat sensor adjacent an exposed surface of the substance for responding to radiation heat energy to generate a signal representative of the temperature level of the exposed surface of the substance;
   irradiating the exposed surface of the substance and the heat sensor with radiation heat energy;
   removing the radiation heat energy from the substance and the heat sensor in response to the heat sensor signal when the signal is representative of the exposed surface reaching a predetermined maximum temperature level;
   allowing the exposed surface of the substance to cool to a predetermined lower temperature level;
   reapplying the radiation heat energy in response to the heat sensor signal when the signal is representative of the exposed surface of the substance reaching the predetermined lower temperature level to reheat the exposed surface to the predetermined maximum temperature level; and
   repeating said removing and said reapplying steps in sequence until the surface of the substance opposite the exposed surface is cured.

2. The method of claim 1 wherein said irradiating and reapplying steps comprise energizing a radiation heat energy source, and wherein said removing step comprises deenergizing the radiation heat energy source.

3. The method of claim 2 wherein the radiation heat energy source comprises an electrical-powered radiant heater, and including the step of operating a switch responsive to the heat sensor signal to control energization and deenergization of the radiant heater.

4. A method of curing a heat curable adhesive substance, comprising the steps of:
   providing a radiation heat energy source for generating radiation heat energy for irradiating an exposed surface of the adhesive substance; and
   responding to the temperature level of the exposed surface of the substance for energizing the source to elevate the exposed surface rapidly to a predetermined and substantially maximum temperature level which the substance can withstand without degradation and for thereupon deenergizing the source to allow the exposed surface to cool to a predetermined lower temperature, and for repeating said energizing and deenergizing steps until the surface of the adhesive substance opposite the exposed surface reaches a predetermined temperature level.

5. A method of curing a heat curable adhesive substance, comprising:
providing an energizable source of radiation heat energy;
positioning the adhesive substance in close proximity with the source for irradiation thereof;
energizing the source to irradiate an exposed surface of the adhesive substance with radiation heat energy to elevate the temperature level of the exposed surface relatively rapidly to a predetermined and substantially maximum temperature level which the substance can withstand without degradation;
responding to the temperature level of the exposed surface of the adhesive substance to deenergize the source when the exposed surface reaches the predetermined maximum temperature level;
maintaining the source deenergized for a time period sufficient to allow the exposed surface of the adhesive substance to cool to a predetermined lower temperature level;
reenergizing the source to reelevate the temperature level of the adhesive substance to the predetermined maximum temperature level; and
repeating said responding, maintaining, and reenergizing steps in sequence until the surface of the adhesive substance opposite the exposed surface is cured.

6. A method of curing a heat curable substance in a plurality of successive batches, comprising the steps of:
providing an energizable source of radiation heat energy;
positioning the adhesive substance in close proximity with the source for irradiation thereof;
positioning a heat sensor adjacent the exposed surface of the adhesive substance for responding to radiation heat energy to generate a signal representative of the temperature level of the exposed surface of the adhesive substance
deenergizing the source in response to the heat sensor signal when the signal is representative of the exposed surface reaching a predetermined maximum temperature level which the substance can withstand without degradation;
maintaining the source deenergized for a time period sufficient to allow the exposed surface of the adhesive substance and the heat sensor to cool each to a predetermined lower temperature level;
reenergizing the source to reelevate the temperature level of the heat sensor to the predetermined maximum temperature level in response to the heat sensor signal when the signal is representative of the substance reaching the predetermined lower temperature level;
repeating said deenergizing and reenergizing steps in sequence until the adhesive substance is cured; and
reducing the temperature level of the heat sensor substantially to ambient temperature prior to irradiation of the next batch of adhesive substance.

7. In an insulated window or door unit having a pair of spaced panes of glazing material spaced in parallel with each other by a peripheral spacer inset slightly from the peripheral edge of the panes, and a peripheral bead of a heat curable adhesive substance received between the panes and peripherally about the spacer, a method of curing the adhesive substance, comprising the steps of:
positioning a heat sensor adjacent an exposed surface of the substance for responding to radiation heat energy to generate a signal representative of the temperature level of the exposed surface of the substance;
irradiating the exposed surface of the adhesive substance and the heat sensor with radiation heat energy;
removing the radiation heat energy from the adhesive substance and the heat sensor in response to the heat sensor signal when the signal is representative of the exposed surface reaching a predetermined maximum temperature level;
allowing the exposed surface of the adhesive substance to cool to a predetermined lower temperature level;
reapplying the radiation heat energy in response to the heat sensor signal when the signal is representative of the exposed surface of the adhesive substance reaching the predetermined lower temperature level to reheat the exposed surface to the predetermined maximum temperature level; and
repeating said removing, allowing, and reapplying steps in sequence until the adhesive substance is cured.

8. In an insulated window or door unit having a pair of spaced panes of glazing material spaced in parallel with each other by a peripheral spacer inset slightly from the peripheral edge of the panes, and a peripheral bead of a heat curable adhesive substance received between the panes and peripherally about the spacer, a method of curing the adhesive substance, comprising the steps of:
providing a radiation heat energy source for generating radiation heat energy for irradiating an exposed surface of the adhesive substance; and
responding to the temperature level of the exposed surface of the substance for energizing the source to elevate the exposed surface rapidly to a predetermined and substantially maximum temperature level which the substance can withstand without degradation and for thereupon deenergizing the source to allow the exposed surface to cool to a predetermined lower temperature, and for repeating said energizing and deenergizing steps until the surface of the adhesive substance opposite the exposed surface reaches a predetermined temperature level.

9. In a plurality of insulated window or door units each having a pair of panes of glazing material spaced in parallel from each other by a peripheral spacer inset slightly from the peripheral edge of the panes, and a peripheral bead of a heat curable adhesive substance received between the panes and peripherally about the space, a method of curing the units in sequence, comprising the steps of:
providing an energizable source of radiation heat energy;
conveying a first unit into close proximity with the source for irradiation of at least one peripheral edge thereof for irradiating the adhesive substance thereat;
positioning a heat sensor adjacent the exposed surface of the adhesive substance for responding to the radiation heat energy to generate a signal representative of the temperature level of the exposed surface of the substance;

energizing the source to irradiate the exposed surface of the substance and the heat sensor with radiation heat energy;

deenergizing the source in response to the heat sensor signal when the signal is representative of the exposed surface reaching a predetermined maximum temperature level which the substance can withstand without degradation;

maintaining the source deenergized for a time period sufficient to allow the heat sensor and the exposed surface of the adhesive substance to cool each to a predetermined lower temperature level;

reenergizing the source to reelevate the temperature level of the heat sensor to the predetermined elevated temperature level in response to the heat sensor signal when the signal is representative of the substance reaching the predetermined lower temperature level;

repeating said deenergizing and reenergizing steps in sequence until the adhesive substance is cured;

reducing the temperature level of the heat sensor prior to irradiation of the next unit; and conveying the next unit into close proximity with the source for irradiation.

10. The method of claim 9 wherein the source comprises at least two sources of radiation heat energy positioned generally at right angles to each other for simultaneous irradiation of at least two peripheral edges of the first unit.

* * * * *